(12) United States Patent
Braun et al.

(10) Patent No.: US 10,415,576 B2
(45) Date of Patent: Sep. 17, 2019

(54) METHOD OF DETERMINATION AND GAS TURBINE

(71) Applicant: Siemens Aktiengesellschaft, Munich (DE)

(72) Inventors: Stefan Braun, Neukirchen-Vluyn (DE); Tjark Eisfeld, Mettmann (DE); Marco Larson, Mülheim (DE); Ulrich Waltke, Mülheim an der Ruhr (DE)

(73) Assignee: Siemens Aktiengesellschaft, Munich (DE)

(*) Notice: Subject to any disclaimer, the term of this patent is extended or adjusted under 35 U.S.C. 154(b) by 522 days.

(21) Appl. No.: 15/108,854

(22) PCT Filed: Nov. 28, 2014

(86) PCT No.: PCT/EP2014/075961
§ 371 (c)(1),
(2) Date: Jun. 29, 2016

(87) PCT Pub. No.: WO2015/101450
PCT Pub. Date: Jul. 9, 2015

(65) Prior Publication Data
US 2016/0327051 A1 Nov. 10, 2016

(30) Foreign Application Priority Data
Jan. 3, 2014 (EP) .................... 14150126

(51) Int. Cl.
*F04D 29/56* (2006.01)
*F02C 9/20* (2006.01)
(Continued)

(52) U.S. Cl.
CPC ........... *F04D 27/001* (2013.01); *F01D 25/02* (2013.01); *F02C 9/20* (2013.01); *F02C 9/28* (2013.01);
(Continued)

(58) Field of Classification Search
CPC ...... F04D 27/001; F04D 27/002; F04D 19/00; F04D 29/324; F04D 29/524;
(Continued)

(56) References Cited

U.S. PATENT DOCUMENTS 3,284,003 A 11/1966 Ciemochowski
3,979,903 A * 9/1976 Hull, Jr. .................... F02C 7/05
60/39.092
(Continued)

FOREIGN PATENT DOCUMENTS

CN 201934287 U 8/2011
CN 103216454 A 7/2013
(Continued)

OTHER PUBLICATIONS

JP Office Action dated Dec. 5, 2016, for JP patent application No. 2016-522557.
(Continued)

*Primary Examiner* — Richard A Edgar
(74) *Attorney, Agent, or Firm* — Beusse Wolter Sanks & Maire

(57) ABSTRACT

An ascertainment method for determining a final angle of vanes that are adjustable between an initial angle and the final angle and are part of a row of leading vanes which are arranged upstream of a row of trailing vanes of a compressor in a gas turbine, in order to prevent ice from forming in the compressor. During operation of the gas turbine, a current value of at least one process parameter is determined in a parameter ascertainment step, whereupon the final angle is defined in accordance with the value in a final-angle defining step, an aerodynamic speed being determined as the process parameter.

7 Claims, 3 Drawing Sheets

(51) Int. Cl.
*F02C 9/28* (2006.01)
*F01D 25/02* (2006.01)
*G01K 13/00* (2006.01)
*F04D 29/54* (2006.01)
*F04D 29/32* (2006.01)
*F04D 27/00* (2006.01)
*F04D 19/00* (2006.01)

(52) U.S. Cl.
CPC ............ *F04D 19/00* (2013.01); *F04D 27/002* (2013.01); *F04D 29/324* (2013.01); *F04D 29/542* (2013.01); *F04D 29/563* (2013.01); *G01K 13/00* (2013.01); *F05B 2220/302* (2013.01); *F05B 2240/12* (2013.01)

(58) Field of Classification Search
CPC .......... F04D 29/563; F01D 25/02; F02C 9/20; F02C 9/28; G01K 13/00; F05B 2220/302; F05B 2240/12
See application file for complete search history.

(56) References Cited

U.S. PATENT DOCUMENTS

| | | | |
|---|---|---|---|
| 4,247,256 A | 1/1981 | Maghon | |
| 5,865,600 A | 2/1999 | Mori et al. | |
| 6,233,917 B1* | 5/2001 | Bahr | F02C 7/047 165/230 |
| 8,403,621 B2* | 3/2013 | Guemmer | F02C 9/22 415/1 |
| 8,762,025 B2* | 6/2014 | Aurousseau | F02C 9/52 415/154.3 |
| 2007/0031238 A1 | 2/2007 | Fujii et al. | |
| 2011/0197593 A1 | 8/2011 | Fuchs et al. | |
| 2013/0189074 A1 | 7/2013 | Chen et al. | |
| 2015/0027129 A1 | 1/2015 | Franitza et al. | |
| 2015/0081121 A1* | 3/2015 | Morgan | F01D 21/003 700/287 |

FOREIGN PATENT DOCUMENTS

| | | |
|---|---|---|
| DE | 102004025628 A1 | 12/2005 |
| JP | S34011701 U | 6/1955 |
| JP | S62148366 U | 9/1987 |
| JP | S64053429 U1 | 4/1989 |
| JP | H09133005 | 5/1997 |
| JP | 2007040171 A | 2/2007 |
| JP | 2011032869 A | 2/2011 |
| JP | 2012500362 A | 1/2012 |
| WO | 2010020595 A2 | 2/2010 |
| WO | 2012052965 A1 | 4/2012 |
| WO | 2013144111 A1 | 10/2013 |

OTHER PUBLICATIONS

EP Office Action under Article 94(3) EPC dated Mar. 27, 2018, for EP patent application No. 14808570.7.
JP Notice of Allowance dated Dec. 4, 2017, for JP patent application No. 2016544504.
JP Office Action dated Jun. 26, 2017, for JP patent application No. 2016544504.
CN Office Action dated Nov. 28, 2016, for CN patent application No. 201480072121.5.

* cited by examiner

METHOD OF DETERMINATION AND GAS TURBINE

CROSS REFERENCE TO RELATED APPLICATIONS

This application is the US National Stage of International Application No. PCT/EP2014/075961 filed Nov. 28, 2014, and claims the benefit thereof. The International Application claims the benefit of European Application No. EP14150126 filed Jan. 3, 2014. All of the applications are incorporated by reference herein in their entirety.

FIELD OF INVENTION

The present invention relates to a gas turbine and to a method of determination for determining a final angle of guide vanes of a row of guide vanes of a compressor of the gas turbine that are adjustable between an initial angle and the final angle for the prevention of ice formation in the compressor.

BACKGROUND OF INVENTION

It is known in the prior art to adapt the air mass flow that is taken in by the compressor of gas turbines in part load operation by a variable adjustment of the compressor inlet guide vanes. In this way, an efficiency that is as great as possible can be achieved for a given maximum temperature of the exhaust gas. One of the limiting factors for the permissible final angle of the variable compressor inlet guide vanes is in this case a cooling of the intake air in the region of the row of inlet guide vanes and/or the first row of compressor rotor blades and the associated risk of icing. In dependence on the humidity of the intake air, the acceleration of the flow downstream of the row of inlet guide vanes, which leads to the cooling of the flow, may cause icing in the compressor, and consequently an impairment of the integrity of the machine and possibly damage to the machine.

It is customary in the prior art to set definitively fixed values in advance for assumed values of the process parameters. As a result, the operating range of the gas turbine is not fully exploited in every situation.

A variable setting is proposed by JP 2011032869 A, which teaches performing the setting on the basis of the current compressor inlet temperature and the atmospheric humidity. However, the setting on this basis requires the computational determination of a dedicated characteristic map, which among other things represents an undesirably great technical expenditure and possibly requires additional operational measurement stations.

SUMMARY OF INVENTION

The present invention is based on an object of overcoming these disadvantages and providing a simple method of determination for the variable determination of the final angle and also a gas turbine for performing this method of determination.

This object is achieved by a method of determination and by a gas turbine as claimed. Advantageous developments of the invention are specified in the subclaims and described in the description.

In the case of the method of determination according to the invention, for determining a final angle of guide vanes of a front row of guide vanes, arranged upstream of a rear row of rotor blades or guide vanes, of a compressor of a gas turbine that are adjustable between an initial angle and the final angle for the prevention of ice formation in the compressor, a current value of at least one process parameter is ascertained during the operation of the gas turbine in a parameter ascertaining step, and subsequently, in dependence on the value, the final angle is fixed in a final-angle fixing step, an aerodynamic speed being ascertained as the process parameter.

With this arrangement it is advantageously made possible to extend the operating range of the gas turbine, and thereby increase its possibilities for use and efficiency. Instead of using a definitively fixed final angle, as known for instance from the prior art, the final angle can be adapted to the currently prevailing conditions.

The aerodynamic speed is also ascertained in any case during the operation of the gas turbine for its open-loop or closed-loop control. As a result, the use of this variable for the variable fixing of the final angle can be easily performed, for instance by a set of achievable aerodynamic speeds being assigned a corresponding set of suitable final angles and a suitable, current value of a final angle being selected according to the prevailing aerodynamic speed. Moreover, no additional operational measurement stations are necessary. The aerodynamic speed, which is also known as the reduced speed, is obtained from the mechanical speed of the rotor by correction with the inlet temperature.

Among the effects in a gas turbine of a change in the mechanical speed, and consequently also the aerodynamic speed, is also a change in the mass flow that is taken in and delivered. This in turn has an influence on the flow rates within the compressor in the region of the blades or vanes. Dependent on flow rates, in the compressor there forms a temperature distribution, which on account of the locally resulting static temperatures may or may not make it possible for ice to form. In particular for starting operations in the case of customary gas turbines, or when there are disturbances in the network of network-synchronous compressors and in the case of variable speed compressors, inclusion of the actual speed is advantageous.

In an advantageous version of the method of determination according to the invention, the value of a temperature is ascertained. In this case, an air temperature of an area surrounding the gas turbine may be ascertained as the temperature or else a surface temperature at the rear row of rotor blades or guide vanes may be ascertained.

The temperature is an essential parameter that has an influence on ice formation. The dependence of the final angle on the temperature easily allows ice formation to be avoided. Temperatures can be measured easily and with low costs. As a result, the method of determination according to the invention can be easily implemented.

In a further advantageous version of the method of determination according to the invention, the final angle is fixed in such a way that the surface temperature remains above 0° C.

In this way, ice formation is prevented and the compressor is protected from damage by ice.

In a further advantageous version of the method of determination according to the invention, the value of an atmospheric humidity or a relative atmospheric humidity is ascertained.

The atmospheric humidity or the relative atmospheric humidity is an essential parameter that has an influence on ice formation. The dependence of the final angle on the atmospheric humidity or the relative atmospheric humidity allows ice formation to be easily avoided.

In a further advantageous version of the method of determination according to the invention, the relative atmospheric humidity downstream of the front row of guide vanes and upstream of the rear row of guide vanes is ascertained.

Due to the strong acceleration of the air flow, this is the coldest place within the compressor during the operation of the gas turbine. The potential of the air to absorb moisture is at the lowest and the relative atmospheric humidity is at the greatest at this place. Ascertainment at the coldest place ensures that the coldest temperature in the machine is taken into account.

The gas turbine according to the invention comprises a compressor. This compressor has a front row of guide vanes and, arranged downstream of the front row of guide vanes, a rear row of rotor blades or guide vanes. The front row of guide vanes comprises guide vanes that are adjustable between an initial angle and a final angle. The gas turbine according to the invention also has at least one operational measurement point and an evaluation unit connected in a data-conducting manner to the operational measurement point. The evaluation unit is designed to carry out the method of determination according to the invention.

The gas turbine can consequently use the advantages of the method of determination according to the invention and has an increased operating range.

Exemplary embodiments of the invention are explained in more detail on the basis of the drawings and in the description that follows.

DETAILED DESCRIPTION OF INVENTION

Figure 1:
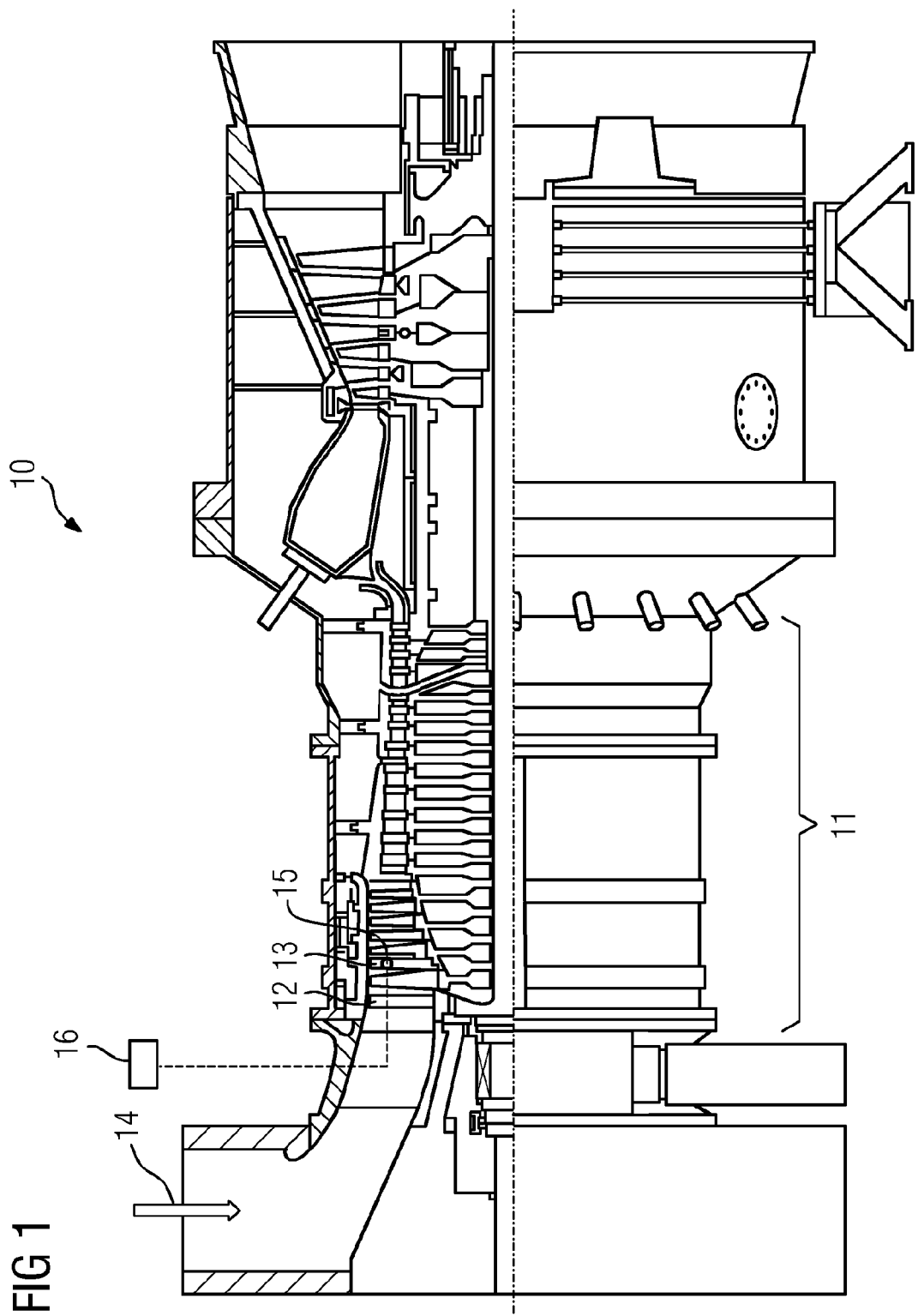
FIG. 1 shows a gas turbine according to the invention.

In FIG. 1, a gas turbine 10 according to the invention is outlined by way of example in a sectional representation. The gas turbine 10 comprises a compressor 11, in which an air mass flow 14 that is taken in is compressed. As is customary in the prior art, the compressor 11 has rows of rotor blades and rows of guide vanes.

In the gas turbine 10 according to the invention, the compressor 11 comprises a front row of guide vanes 12 and a rear row of guide vanes 13. The front row of guide vanes 12 is arranged upstream of the rear row of guide vanes 13 and the rear row of guide vanes 13 is arranged downstream of the front row of guide vanes 12. In this case, the front row of guide vanes 12 is advantageously what is known as a row of inlet guide vanes 12 and the rear row of guide vanes 13 is the row of guide vanes following next downstream, known as the first row of guide vanes 13. This is the way in which it is shown in FIG. 1. Shown in between is a row of rotor blades.

The front row of guide vanes 12 has adjustable guide vanes, as are known from the prior art. The guide vanes of the rear row of guide vanes 13 may likewise be adjustable. The guide vanes of the front row of guide vanes 12 are adjustable in a range between an initial angle and a final angle E. With an adjustment of the guide vanes, the air mass flow 14 that flows through the gas turbine 10 is regulated. The initial angle marks the basic position of the guide vanes, in which the greatest possible air mass flow can flow. With adjustment of the guide vanes, the air mass flow is reduced, until the air mass flow 14 is minimized when the final angle E is reached. The further away the final angle E is from the initial angle, the greater the adjusting range of the guide vanes.

In the case of the gas turbine 10 according to the invention, the final angle E is variably determinable. For this purpose, the gas turbine 10 has an evaluation unit 16 and an operational measurement point 15 connected in a data-conducting manner to the evaluation unit 16. The operational measurement point 15 is designed to measure current values of at least one process parameter. It is also conceivable that the gas turbine 10 has a number of operational measurement points 15 for measuring different process parameters. The operational measurement point 15 is a measuring point for a temperature T and/or for an absolute atmospheric humidity H or for a relative atmospheric humidity h. Moreover, the operational measurement point 15 may be a measuring point for a mechanical speed of the gas turbine 10. The at least one operational measurement point 15 may be arranged inside the gas turbine 10 or outside in the area surrounding the gas turbine 10.

In the configuration shown, the operational measurement point 15 is arranged inside the gas turbine 10 at the rear row of guide vanes 13 and is designed to measure the temperature T of the surface of the guide vanes of the rear row of guide vanes 13. The evaluation unit 16 connected to the operational measurement point 15 determines the final angle E in the method of determination 20 according to the invention.

Figure 2:
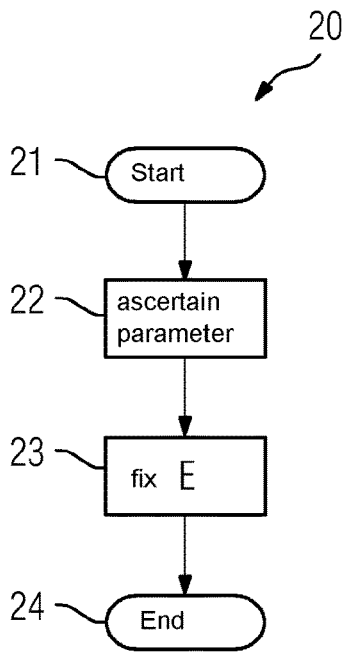
FIG. 2 shows a method of determination according to the invention.

The method of determination 20 according to the invention is shown by way of example in FIG. 2 in a diagram from a start 21 to an end 24. In order to prevent ice formation in the compressor 11, according to the invention a current value of at least one process parameter is ascertained during the operation of the gas turbine 10 in a parameter ascertaining step 22. Subsequently, in dependence on this value, the final angle E is fixed in a final-angle fixing step 23.

In the parameter ascertaining step 22, the current value inside or else outside the gas turbine may be detected.

The final-angle fixing step 23 may be performed either computationally by use of a stored formula, in the case of which the final angle E is a function of the parameter ascertained, or by allocation of a final angle from a stored table, in which various final angles E are predefined for various values of the parameter. The final angle E is different for identical process parameters of different types of gas turbine. Thus, the final-angle fixing step 23 must be performed individually for each type of gas turbine.

Figure 3:
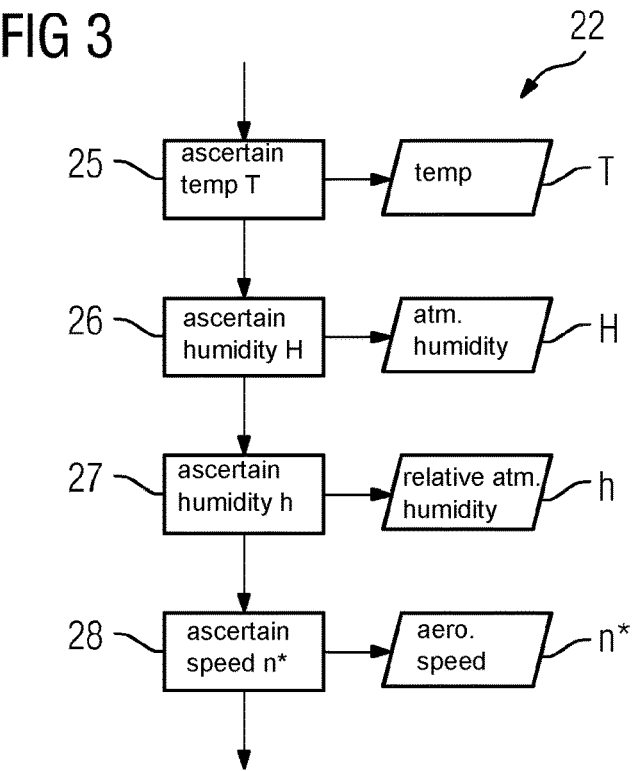
FIG. 3 shows a parameter ascertaining step of the method of determination.

In FIG. 3, the parameter ascertaining step 22 is shown in a diagram in a version that is given by way of example. In the variant shown, values of four different parameters are ascertained. According to the invention, it is at least one.

In a temperature ascertaining step 25, the value of the temperature T is ascertained. In an atmospheric-humidity ascertaining step 26, the value of the atmospheric humidity H is ascertained. In a relative atmospheric-humidity ascertaining step 27, the value of the relative atmospheric humidity h is ascertained. And in an aerodynamic-speed ascertaining step 28, the value of an aerodynamic speed $n^*$ is ascertained.

The temperature ascertaining step 25 may be performed inside or outside the gas turbine 10. An air temperature of an area surrounding the gas turbine 10 and/or an air temperature of the air mass flow 14 or else a surface temperature on a material surface in the interior of the gas turbine, in particular a surface temperature of the rear row of guide vanes 13, may be ascertained as the temperature T. In the interior of the gas turbine 10, the air temperature is ascertained in particular downstream of the front row of guide vanes 12 and upstream of the rear row of guide vanes 13, because the coldest place is there. Dependent on the temperature T, the final angle E is chosen in particular in such a way that the temperature T, in particular the surface temperature of the rear row of guide vanes 13, remains above 0° C.

The place at which the surface temperature of the guide vanes is ascertained lies in particular at a vane front edge, in particular at an outer region of the vane front edge, in particular at approximately one quarter of the height of the guide vane viewed radially in the direction of the axis of rotation. The coldest point of the surface of the guide vane is expected at this location. Ideally, the place at which the surface temperature of the guide vane is ascertained is ascertained individually for each gas turbine, and in particular each operating mode. The surface temperature may in this case also be ascertained contactlessly.

The atmospheric-humidity ascertaining step 26 and also the relative atmospheric-humidity ascertaining step 27 may likewise be performed inside or outside the gas turbine 10. The atmospheric humidity H or the relative atmospheric humidity h is ascertained in particular within the air mass flow 14. In particular, the relative atmospheric humidity h is ascertained downstream of the front row of guide vanes 12 and upstream of the rear row of guide vanes 13, because the coldest place is there and, with constant atmospheric humidity H, the place with the highest relative atmospheric humidity h is also there. The final angle E is fixed in particular in such a way that the relative atmospheric humidity h remains less than 100%.

The aerodynamic-speed ascertaining step 28 is performed by measuring the mechanical speed of the gas turbine 10 and also the temperature T. The final angle E may be formed as a function of the aerodynamic speed n*, which can then be derived from the mechanical speed by correction with an inlet temperature. Details of this are described on page 346 in the book "Stationäre Gasturbinen" [stationary gas turbines] (first edition) edited by Jörg Seume.

Figure 4:
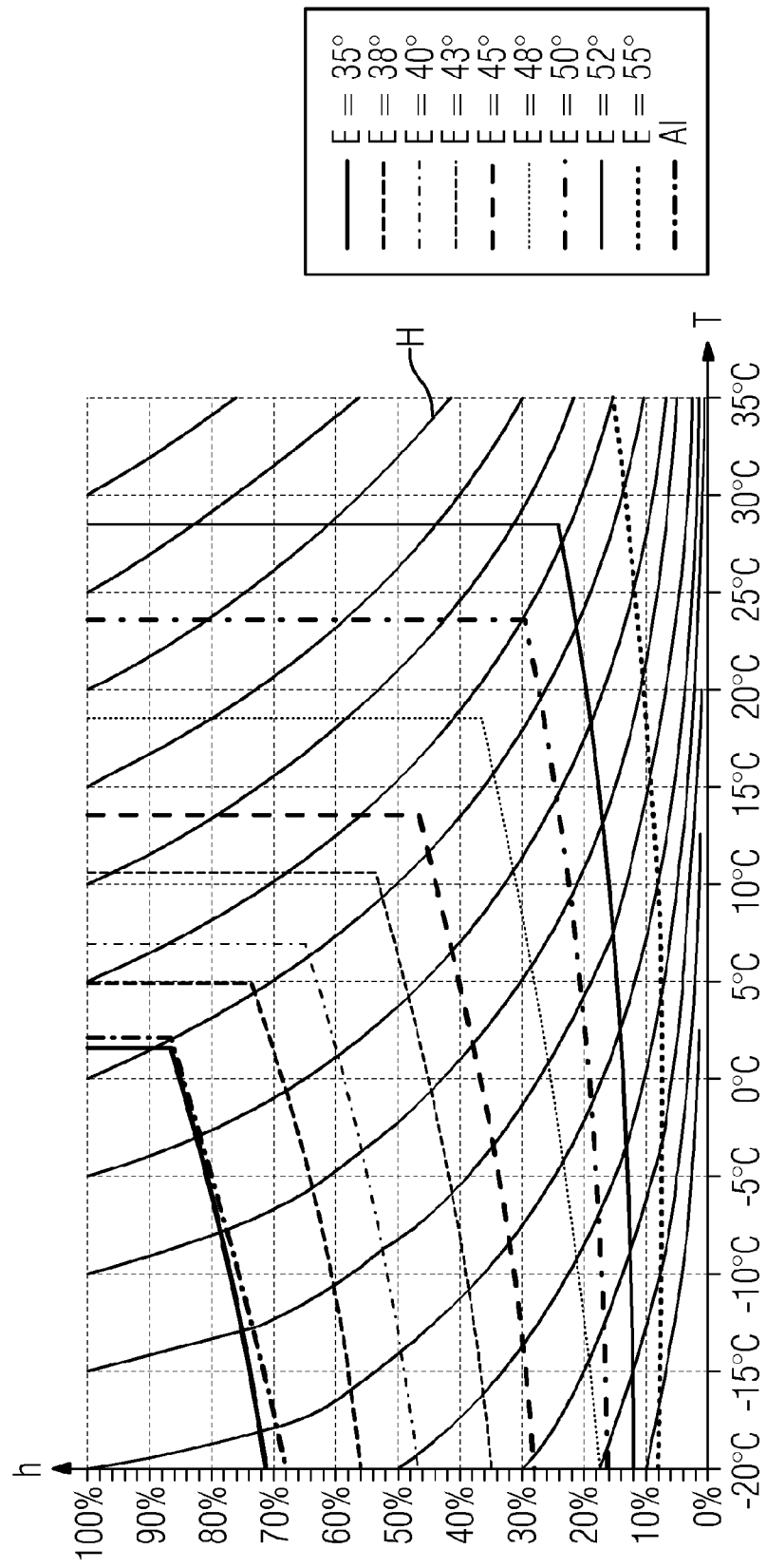
FIG. 4 shows a diagram of final angles given by way of example.

FIG. 4 shows for purposes of illustration and by way of example the final angles E in dependence on the temperature T and the relative atmospheric humidity h for a specific type of gas turbine. The values for the atmospheric humidity H are plotted here by way of example on the basis of constants. The final angles E range here from 35° C. to 55° C. Moreover, FIG. 4 shows the limiting line for an "Anti-Icing" method of ice prevention AI that is known from the prior art. In the case of the method of ice prevention AI, the air mass flow 14 is heated, in particular with a warmer air flow that is taken further downstream. The method of determination 20 according to the invention may also be performed during the method of ice prevention AI or some other air preheating step.

Ice formation occurs if both the temperature lies below 0° C. and the relative humidity on the blade or vane concerned is greater than 100%. This applies to the rotor blades and the guide vanes. Freezing of the rotor blade is less likely, however, because of the centrifugal forces during operation, and is therefore observed less in practice, even if the coldest temperature is expected at the rotor blade. It is possible in principle to carry out the measurement of the lowest temperature at the rotor blade, but it is more difficult than at the guide vane.

Although the invention has been more specifically illustrated and described in detail by the exemplary embodiment, the invention is not restricted by the disclosed examples and other variations can be derived herefrom by a person skilled in the art without departing from the scope of protection of the invention.

The invention claimed is:

1. A method of determination for determining a final angle of guide vanes of a front row of guide vanes, arranged upstream of a rear row of rotor blades or guide vanes, of a compressor of a gas turbine that are adjustable between an initial angle and the final angle for prevention of ice formation in the compressor, the method comprising:
   ascertaining a current value of at least one process parameter during operation of the gas turbine in a parameter ascertaining step, and
   subsequently, in dependence on the current value of the at least one process parameter, fixing the final angle in a final-angle fixing step, such that the final angle is effective to provide a maximum possible restriction of air flow through the compressor without permitting ice formation in the compressor,
   wherein the at least one process parameter comprises an aerodynamic speed that is derived from a mechanical speed of the gas turbine by correction with an inlet temperature of air entering the compressor.

2. The method of determination as claimed in claim 1, further comprising:
   ascertaining a value of at least one temperature other than the inlet temperature,
   wherein the current value of the at least one process parameter comprises the value of the at least one temperature other than the inlet temperature.

3. The method of determination as claimed in claim 2, ascertaining a surface temperature at the rear row of the rotor blades or the guide vanes,
   wherein the current value of the value of at least one temperature other than the inlet temperature comprises the surface temperature at the rear row of the rotor blades or the guide vanes.

4. The method of determination as claimed in claim 3, wherein the final angle is fixed in such a way that the surface temperature at the rear row of the rotor blades or the guide vanes remains above 0° C.

5. The method of determination as claimed in claim 1, further comprising:
   ascertaining a value of an atmospheric humidity,
   wherein the current value of the at least one process parameter comprises the value of the atmospheric humidity.

6. The method of determination as claimed in claim 1, further comprising:
   ascertaining a value of a relative atmospheric humidity,
   wherein the current value of the at least one process parameter comprises the value of the relative atmospheric humidity.

7. A gas turbine with a compressor, comprising:
   a front row of guide vanes comprising guide vanes that are adjustable between an initial angle and a final angle and,
   arranged downstream of the front row of guide vanes, a rear row of guide vanes,
   at least one operational measurement point, and an evaluation unit connected in a data-conducting manner to the at least one operational measurement point, which carries out a method of determination as claimed in claim 1.

* * * * *